United States Patent [19]

Freeman et al.

[11] 3,962,142

[45] June 8, 1976

[54] ELECTRICALLY CONDUCTING CONCRETE

[75] Inventors: Alan Freeman; William Hymers, Chelmsford, both of England

[73] Assignee: The Marconi Company Limited, Chelmsford, England

[22] Filed: Feb. 7, 1974

[21] Appl. No.: 440,547

[30] Foreign Application Priority Data

Feb. 7, 1973 United Kingdom................. 5956/73
July 6, 1973 United Kingdom............... 32442/73

[52] U.S. Cl................................ 252/503; 106/97; 174/35 MS; 252/502; 252/508; 252/509
[51] Int. Cl.².......................................... H01B 1/04
[58] Field of Search .......... 252/503, 502, 508, 509; 106/97, 307

[56] References Cited
UNITED STATES PATENTS

| | | | |
|---|---|---|---|
| 2,108,276 | 2/1938 | Wadsworth....................... | 106/97 X |
| 2,851,639 | 9/1958 | Ford et al............................. | 317/2 |
| 3,166,518 | 1/1965 | Barnard.............................. | 252/503 |
| 3,376,146 | 4/1968 | Mitchell................................ | 106/97 |

*Primary Examiner*—Benjamin R. Padgett
*Assistant Examiner*—E. Suzanne Parr
*Attorney, Agent, or Firm*—Baldwin, Wight & Brown

[57] ABSTRACT

The invention provides a setable composition consisting of a bonding material (e.g. cement) and an aggregate which aggregate contains a quantity of relatively large electrically conductive particulate material and a quantity of relatively small electrically conductive particulate material. In one form the conductive material is gap-graded. In this form if calcined oil coke and acetylene black is used concretes of resistivities of the order of 25Ω ohm-centimeter may be obtained. In another form, the conductive material includes quantities of conductive material ranging in size between the relatively large and the relatively small conductive material. In this form, where the conductive material is calcined oil coke forming the entire aggregate and the size distribution of the coke is such that the spectrum of size is in accordance with one of the National Standards relating to the spectrum of particle sizes recommended for conventional aggregates in cementitious compositions, concretes having resistivities at least as low as 2Ω centimeter may be obtained, whilst still providing satisfactory mechanical strengths.

32 Claims, 14 Drawing Figures

| % PASSING | MESH NUMBER/SIZE ||||||| 
| --- | --- | --- | --- | --- | --- | --- | --- |
|  | 100 | 52 | 25 | 14 | 7 | 3/16 | 3/8 |
| 90% EX. 1 | 3·6 | 18 | 64·8 | 86·4 | 90 | 90 | 90 |
| 10% EX. 2 | 0·15 | 0·5 | 1·2 | 2·5 | 5·6 | 9 | 10 |
| EX.3 | 3·75 | 18·5 | 66·0 | 88·9 | 95·6 | 99 | 100 |
| 80% EX 1 | 3·2 | 16·0 | 57·6 | 76·8 | 80 | 80 | 80 |
| 20% EX 2 | 0·3 | 1·0 | 2·4 | 5·0 | 11·2 | 18 | 20 |
| EX.4 | 3·5 | 17·0 | 60·0 | 81·8 | 91·2 | 98 | 100 |
| 70% EX. 1 | 2·8 | 14·0 | 50·4 | 67·2 | 70 | 70 | 70 |
| 30% EX. 2 | 0·45 | 1·5 | 3·6 | 7·5 | 16·8 | 27 | 30 |
| EX 5 | 3·25 | 15·5 | 54·0 | 74·7 | 86·8 | 97 | 100 |
| 60% EX. 1 | 2·4 | 12·0 | 43·2 | 57·6 | 60 | 60 | 60 |
| 40% EX. 2 | 0·6 | 2·0 | 4·8 | 10·0 | 22·4 | 36 | 40 |
| EX. 6 | 3·0 | 14·0 | 48·0 | 67·6 | 82·4 | 96 | 100 |
| 50% EX. 1 | 2·0 | 10·0 | 36·0 | 48·0 | 50 | 50 | 50 |
| 50% EX. 2 | 0·75 | 2·5 | 6·0 | 12·5 | 27 | 45 | 50 |
| EX. 7 | 2·75 | 12·5 | 42·0 | 60·5 | 77 | 95 | 100 |
| 40% EX. 1 | 1·6 | 8·0 | 28·8 | 38·4 | 40 | 40 | 40 |
| 60% EX. 2 | 0·9 | 3·0 | 7·2 | 15·0 | 33·6 | 54 | 60 |
| EX 8 | 2·5 | 11·0 | 36·0 | 53·4 | 73·6 | 94 | 100 |
| 30% EX. 1 | 1·2 | 6·0 | 21·6 | 28·8 | 30 | 30 | 30 |
| 70% EX. 2 | 1·05 | 3·5 | 8·4 | 17·5 | 39·2 | 63 | 70 |
| EX 9 | 2·25 | 9·5 | 30·0 | 46·3 | 69·2 | 93 | 100 |
| 20% EX. 1 | 0·8 | 4·0 | 14·4 | 19·2 | 20 | 20 | 20 |
| 80% EX. 2 | 1·2 | 4·0 | 9·6 | 20·0 | 44·8 | 72 | 80 |
| EX.10 | 2·0 | 8·0 | 24·0 | 39·2 | 64·8 | 92 | 100 |
| 10% EX. 1 | 0·4 | 2·0 | 7·2 | 9·6 | 10 | 10 | 10 |
| 90% EX. 2 | 1·35 | 4·5 | 10·8 | 22·5 | 50·4 | 81 | 90 |
| EX.11 | 1·75 | 6·5 | 18·0 | 32·1 | 60·4 | 91 | 100 |

FIG. 8.

| MIX NO. | MATERIAL | WEIGHT (gms) | AGGREGATE/ CEMENT WEIGHT | AGGREGATE/ CEMENT VOLUME | H₂O/ CEMENT FREE | H₂O/ CEMENT TOTAL | NUMBER OF SPECIMENS | SIZE OF SPECIMENS (mm²) | 7 DAY ULTIMATE LOAD KN | 7 DAY STRENGTH N/mm² | 28 DAY ULTIMATE LOAD KN | 28 DAY STRENGTH N/mm² |
|---|---|---|---|---|---|---|---|---|---|---|---|---|
| 1. | COKE OPC H₂O | 2000 250 550 | 8 | 12·45 | 1·0 | 2·2 | 2 1 | 70·6 100 | 3 | 0·3 | 0 | 0 |
| 2. | COKE OPC H₂O | 2000 500 600 | 4 | 6·14 | 0·6 | 1·2 | 1 1 | 70·6 70·6 | | | 18 19 | 3·6 4·0 |
| 3. | COKE OPC H₂O | 2000 500 500 | 4 | 6·2 | 0·4 | 1·0 | 2 | 70·6 MEAN OF 2 | 17 | 3·4 | | |
| 4. | COKE OPC H₂O | 1450 485 385 | 3 | | 0·34 | 0·79 | 3 | 70·6 | 44 45 34 | MEAN OF 3 8·2 | | |

| MIX NO. | MATERIAL | WEIGHT (gms) | AGGREGATE/ CEMENT WEIGHT | AGGREGATE/ CEMENT VOLUME | H₂O/ CEMENT FREE | H₂O/ CEMENT TOTAL | NUMBER OF SPECIMENS | SIZE OF SPECIMENS (mm²) | 7 DAY STRENGTH ULTIMATE LOAD KN | 7 DAY STRENGTH N/mm² | 28 DAY STRENGTH ULTIMATE LOAD KN | 28 DAY STRENGTH N/mm² |
|---|---|---|---|---|---|---|---|---|---|---|---|---|
| 5. | COKE OPC H₂O | 1380 550 380 | 2·5 | | 0·31 | 0·69 | 4 | 70·6 | 74 81 80 75 | MEAN OF 4 15·6 | | |
| 6. | COKE OPC H₂O | 1380 550 380 | 2·5 | | 0·31 | 0·69 | 3 | 70·6 | 80 82 87 | MEAN OF 3 16·7 | | |
| 7. | COKE OPC H₂O | 1290 645 375 | 2 | | 0·29 | 0·53 | 3 | 70·6 | 124 120 116 | MEAN OF 3 24·1 | | |
| 8. | COKE OPC H₂O | 2000 1335 630 | 1·5 | 2·32 | 0·25 | 0·47 | 6 | 70·6 | 165 171 163 | 33·1 34·3 32·7 | | |

FIG. 9C.

| MIX NO. | MATERIAL | WEIGHT (gms) | AGGREGATE/ CEMENT WEIGHT | AGGREGATE/ CEMENT VOLUME | H₂O/ FREE CEMENT | H₂O/ TOTAL CEMENT | NUMBER OF SPECIMENS | SIZE OF SPECIMENS (mm²) | 7 DAY STRENGTH ULTIMATE LOAD KN | 7 DAY STRENGTH N/mm² | 28 DAY STRENGTH ULTIMATE LOAD KN | 28 DAY STRENGTH N/mm² |
|---|---|---|---|---|---|---|---|---|---|---|---|---|
| 9. | COKE ACETYLENE BLACK OPC H₂O | 2000 100 500 1000 | 4·2 | 6·47 | 0·7 | 2·0 | 1 1 1 | 70·6 70·6 100 | 11 | 1·1 | 6 8 | 1·2 1·6 |
| 10. | COKE ACETYLENE BLACK OPC H₂O | 2000 60 500 1000 | 4·1 | 6·4 | 0·98 | 2·0 | 6 | 70·6 | MEAN OF 3 4 | 0·8 | MEAN OF 3 8 | 1·6 |
| 11. | COKE ACETYLENE BLACK OPC H₂O | 2000 20 500 1000 | 4 | 6·2 | 0·66 | 1·4 | 6 | 70·6 | MEAN OF 3 14 | 2·9 | MEAN OF 3 19 | 3·9 |
| 12. | COKE ACETYLENE BLACK OPC H₂O | 2000 100 1335 1000 | 1·6 | 2·4 | 0·26 | 0·75 | 6 | 10·6 | MEAN OF 3 83 | 16·6 | MEAN OF 3 113 | 22·7 |

ELECTRICALLY CONDUCTING CONCRETE

This invention relates to electrically conducting arrangements and in particular to electrically conductive materials and structures utilising the same.

It is commonly required to provide a structural material with electrically conductive properties.

In certain buildings, such as hospitals for example, it is desirable to provide anti-static flooring that is to say floors in which static electricity is not permitted to build up. It has previously been proposed to incorporate carbon, in the form, for example, of acetylene black, in concrete to provide concrete flooring having conductive properties, so as to provide a conductive path for static electricity. However, whilst the incorporation of acetylene black in concrete provides the concrete with an electrical resistivity which is lower than that which would apply in the case of a normal concrete the resistivity is still relatively high, (of the order of 150$\Omega$centimeter).

Static electricity will tend to leak away, but it is highly desirable even for such applications for reduced resistivities to be obtained.

For such purposes as forming earth connections for radio aerials, industrial plant, power supplies and the like, resistivities of this order preclude the use of such concretes with limited electrical conductivity. For this reason, for earthing purposes such as the above, it has hitherto been usual practice to employ what are known as chemical earths. In a chemical earth an earthing electrode is provided in a cavity in the earth which is otherwise filled with a conductive filler material which is an electrolyte so that conduction is ionic in nature. At least whilst moist, such ionically conductive filler materials have superior conductive properties compared with concretes having limited conductivity as at present known. A serious disadvantage of such earth connections is that earthing commonly fails due to the filler material drying out.

The present invention seeks to provide an improved electrically conductive structural material, which is particularly well suited for providing earth connections without requiring to be maintained moist as with the chemical type of earth connection.

According to this invention a setable composition for use as a structural material comprises a bonding material and an aggregate wherein said aggregate contains electrically conducting material comprising a quantity of relatively large electrically conductive particulate material and a quantity of relatively small electrically conductive particulate material.

Preferably said electrically conductive material essentially comprises one or more carbonaceous materials.

Whilst the bonding material may take a number of different forms depending upon the use to which the composition is to be put, for example, plaster of Paris or unsaturated polyester resin, preferably said bonding material comprises a cementitious material.

Where the bonding material is cementitious preferably said bonding material comprises at least 50% by weight of one or more materials which are capable of forming on reaction with water, stable, substantially insoluble, hydrated calcium silicates and/or calcium aluminates, and preferably said bonding material includes a Portland cement and/or a high alumina cement.

Preferably said electrically conductive material constitutes at least 20% by weight of the solid contents calculated on a dry weight basis of the setable composition.

Preferably the mean size of said relatively large electrically conductive material is at least ten times the size of said relatively small electrically conductive material.

Preferably again said relatively large electrically conductive material consists of particles of a size such that they are all retained on a number 14 British Standards sieve and said relatively small electrically conductive material consists of particles of a size such that they all pass a number 100 British Standards sieve, in which case the ratio of the quantity by weight of said relatively large electrically conductive material and the quantity of said relatively small electrically conductive material is preferably in the range 1:1 to 50:1.

The electrically conductive material may be gap-graded (as defined by British Standards Definition 2787 of 1956), in which case preferably said electrically conductive material essentially comprises a relatively large electrically conductive material all of a size such as to be retained on a ⅜ inch mesh sieve and a relatively small electrically conductive material all of a size such as to pass a number 300 mesh British Standards sieve, and preferably yet again said relatively large electrically conductive material is of particles having a nominal size of one half inch and said relatively small electrically conductive material is of particles having a nominal diameter ranging from 20 to 50 Angstrom Units.

The use of gap-graded electrically conductive material has enabled concretes to be produced, have electrical resistivities of the order of 25$\Omega$ centimeter. It has been found however that concretes of even lower electrical resistivities, at least as low as 2$\Omega$ centimeter in some cases, can be provided if said electrically conductive material includes quantities of electrically conductive material ranging in size between said relatively large electrically conductive material and said relatively small electrically conductive material.

In this last mentioned case the aggregate may consist of particles of a size distribution such that the slope of a plot of the log to the base 10 of the percentage of particles passing the various sieves against the log to the base ten of the mesh sizes in microns of said sieves is in the range 0.35 to 0.65.

The aggregate may consist of particles of a size distribution such that the spectrum of sizes falls within the extreme limits of the combined specifications of British Standards 882, German Standards DIN1045 and American Standards ASTMC 33, or the equivalents, relating to the spectrum of particle sizes recommended for conventional aggregates in cementitious compositions.

Preferably the aggregate consists of particles of a size distribution such that the spectrum of sizes falls wholly within one National Standard relating to the spectrum of particle sizes recommended for conventional aggregates.

Preferably in such cases said aggregate is composed substantially entirely of electrically conductive material which preferably is calcined oil coke.

Where said electrically conductive material is gap-graded preferably said relatively large electrically conductive material is calcined oil coke and said relatively small electrically conductive material is acetylene black.

Where the composition is cementitious the composition may include waterproofing agents and/or expanding agents as known per se. A suitable expanding agent in this case is aluminium powder added at the rate of 8g/KG of dry cement powder.

Setable compositions provided by the present invention may be used for a wide range of purposes as a structural material, including the formation of earth connections for radio aerials, power supplies, industrial plant and so forth; the provision of building walls having radio frequency screening properties; the provision of anti-static flooring in buildings; the provision of lightening conductors for buildings (a section of wall extending the full height of the building may be composed of a cementitious composition in accordance with the invention) and so forth. Where desirable in a concrete provided by the present invention, conventional reinforcing may be introduced.

Three examples of setable compositions in accordance with the present invention will now be considered in greater detail. In each case the bonding material is cementitious and the electrically conductive material is gap-graded.

EXAMPLE 1

Equal parts of dry sand and ordinary Portland cement are mixed together. To this is added calcined oil coke particles of nominal size ½ inch, that is to say coke which will just pass through a sieve of ½ inch mesh but be retained on a sieve of ⅜ inch mesh. The weight of oil coke added is equal to one third of the weight of the sand/cement mix. Acetylene black of particle size 20 to 50 Angstrom Units is then added. The weight of acetylene black added is 5% of the weight of the basic sand/cement mix. To the cement/total aggregate mix is then added water, the weight of the water added being 20% of the total dry weight of the solids.

EXAMPLE 2

Equal parts of dry sand and ordinary Portland cement are mixed together. To this is added calcined oil coke particles again of nominal size ½ inch. The weight of oil coke added is equal to one third of the weight of the sand/cement mix. Acetylene black of particle size 20 to 50 Angstrom Units is then added. The weight of acetylene black added is 7½% of the weight of the basic sand/cement mix. To the cement/total aggregate mix is then added water, the weight of the water added being 20% of the total dry weight of the solids.

EXAMPLE 3

Equal parts of dy sand and cement are mixed together. To this is added calcined oil coke particles again of nominal size ½ inch. The weight of oil coke added is equal to one third of the weight of the sand/cement mix. Acetylene black of particle size 20 to 50 Angstrom Units is then added. The weight of acetylene black added is 10% of the basic sand/cement mix. to the cement/total aggregate mix is then added water, the weight of the water added being 20% of the total dry weight of the solids.

The resistivities of concretes formed in the above examples will be compared in the following tables, 1500 hours after setting and 4500 hours after setting, with four examples, numbered 4 to 7, of concrete not in accordance with the present invention.

EXAMPLE 4

Example 4 consists of equal parts of dry sand and ordinary Portland cement to which is added water, the weight of water added being 20% of the dry weight of the sand/cement solids.

EXAMPLE 5

Example 5 consists of equal parts of dry sand and ordinary Portland cement to which is added coal coke of nominal size ½ inch. The weight of coal coke added is one third of the weight of the sand/cement mix. To the cement/total aggregate is then added water, the weight of water added being 20% of the total dry weight of the solids.

EXAMPLE 6

Example 6 consists of equal parts of dry sand and ordinary Portland cement to which is added calcined oil coke of nominal size ½ inch. The weight of calcined oil coke added is one third of the weight of the sand/cement mix. To the cement/total aggregate is then added water, the weight of water added being 20% of the total dry weight of the solids.

EXAMPLE 7

Example 7 consists of equal parts of dry sand and ordinary Portland cement to which is added acetylene black of particle size 20 to 50 Angstrom Units. The weight of acetylene black added is 5% of the weight of the sand/cement mix. To the cement/total aggregate is then added water, the weight of water added being 20% of the total dry weight of the solids.

| EXAMPLE | RESISTIVITY IN OHM-CENTIMETERS | |
|---|---|---|
| | AFTER 1500 HOURS | AFTER 4500 HOURS |
| 1 | 28.0 | 27.5 |
| 2 | 29.0 | 23.8 |
| 3 | 20.0 | 20.2 |
| 4 | 9700 | 58900 |
| 5 | 1000 | 7000 |
| 6 | 646 | 3560 |
| 7 | 160 | 168 |

The effect achieved by the present invention may readily be seen from this table. As will also be seen the use of calcined oil coke (Example 6) gives a lower resistivity than the use of coal coke in an otherwise similar composition (Example 5). In compositions in accordance with the present invention the use of calcined oil coke rather than coal coke similarly results in a lower resistivity.

Calcined oil coke or oil coke or petroleum coke as it is often called is coke formed as a result of the distillation of crude oil and is obtainable from many crude oil distilling companies. Carbon apart, a typical specification for calcined oil coke allows for the presence of the following materials in the maximum percentages given:

| | |
|---|---|
| Sulphur | 1.8% maximum |
| Volatile materials | 0.5% maximum |
| Moisture | 0.5% maximum |
| Ash | 0.5% maximum |

The calcined oil coke used in the examples given above, and in the examples to follow, contained, apart from carbon, the following materials in the percentages given:

| | |
|---|---|
| Sulphur (total) | 1.6% |
| Sulphate (as SO$_3$) | 0.01% |
| Volatile matter | 0.3% |
| Moisture | 0.3% |
| Ash | 0.2% |

The sulphur in the coke is there principally as free sulphur bound into the crystal lattice of the coke, a small amount of the total being also present in high molecular weight hydrocarbons which constitute the volatile matter. The low sulphate content in the coke obviates the need to use sulphate resisting cement except in cases where the prevailing concentrations of sulphates in the surrounding soil and/or ground waters necessitate its use.

Further examples of setable compositions in accordance with the present invention will now be considered in which the bonding material is cementitious and said electrically conductive material includes quantities of electrically conductive material ranging in size between said relatively large electrically conductive material and said relatively small electrically conductive material.

Reference will be made to the accompanying drawings, in which.

In the conventional concrete art, it is well known that for maximum mechanical strength — crushing strength — aggregate should be mixed to the cement powder in graded particle sizes in order to reduce the interstitial space between aggregate particles.

Internationally known standards exist by which the spectrum of particle sizes over which the aggregate should be graded for a given mechanical strength, may be determined.

Figure 1:
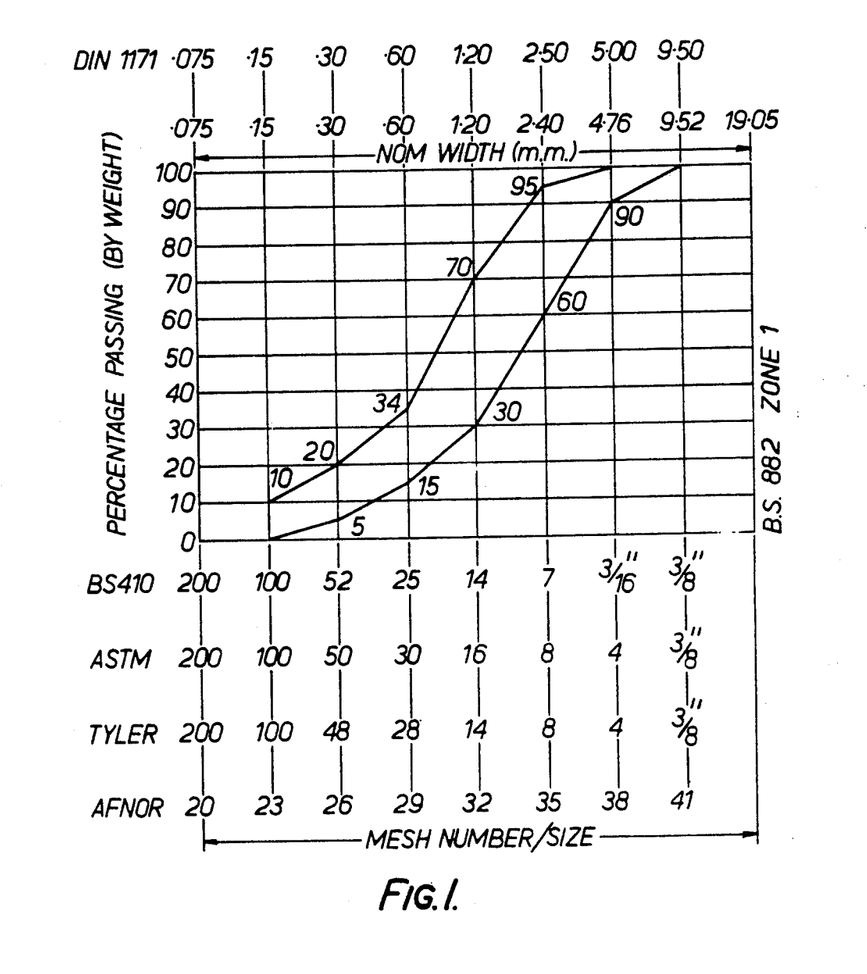
FIGS. 1 to 6 illustrate different National Standards for the grading of conventional aggregate particle sizes.
Figure 2:
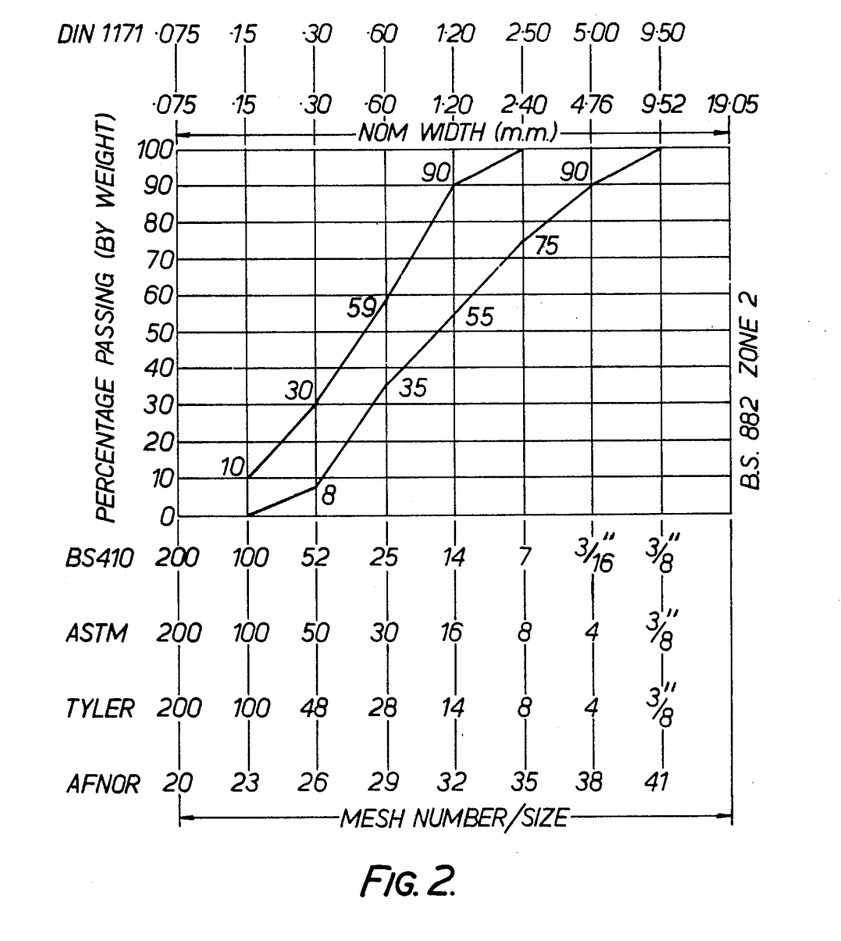
Figure 3:
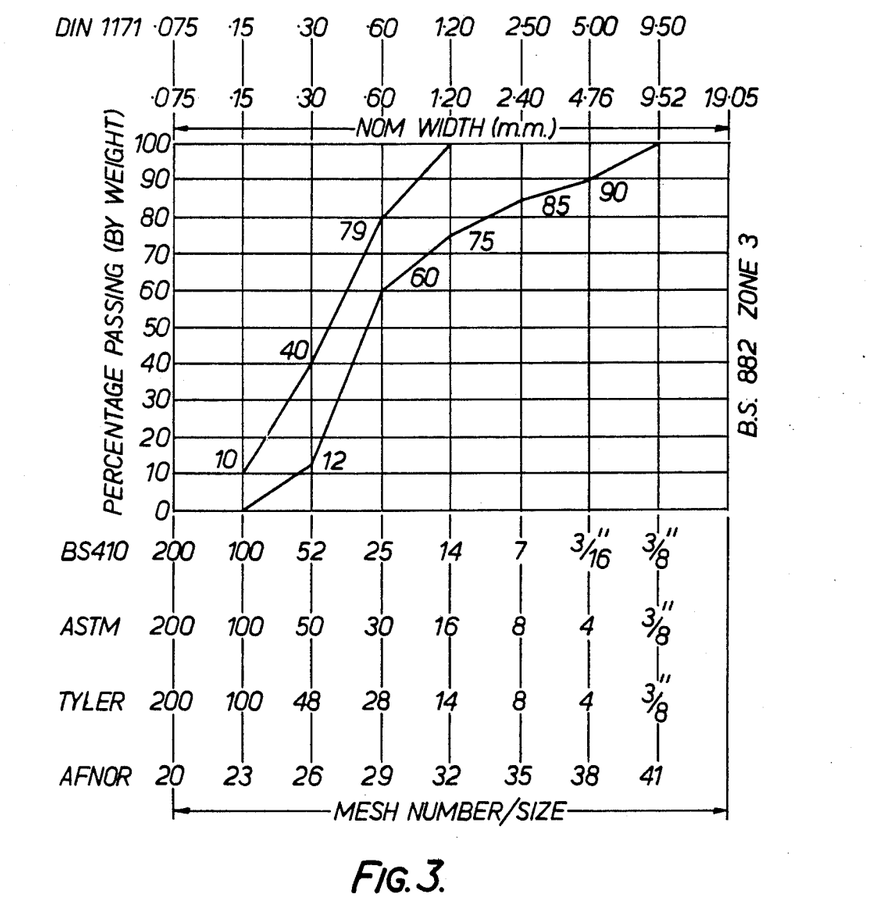
Figure 4:
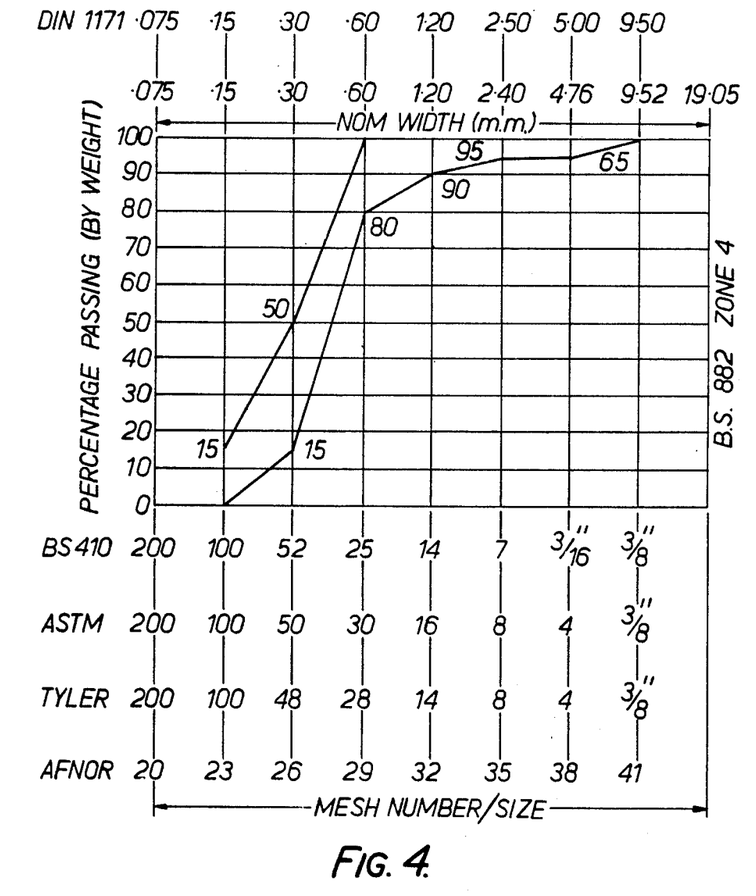
Figure 5:
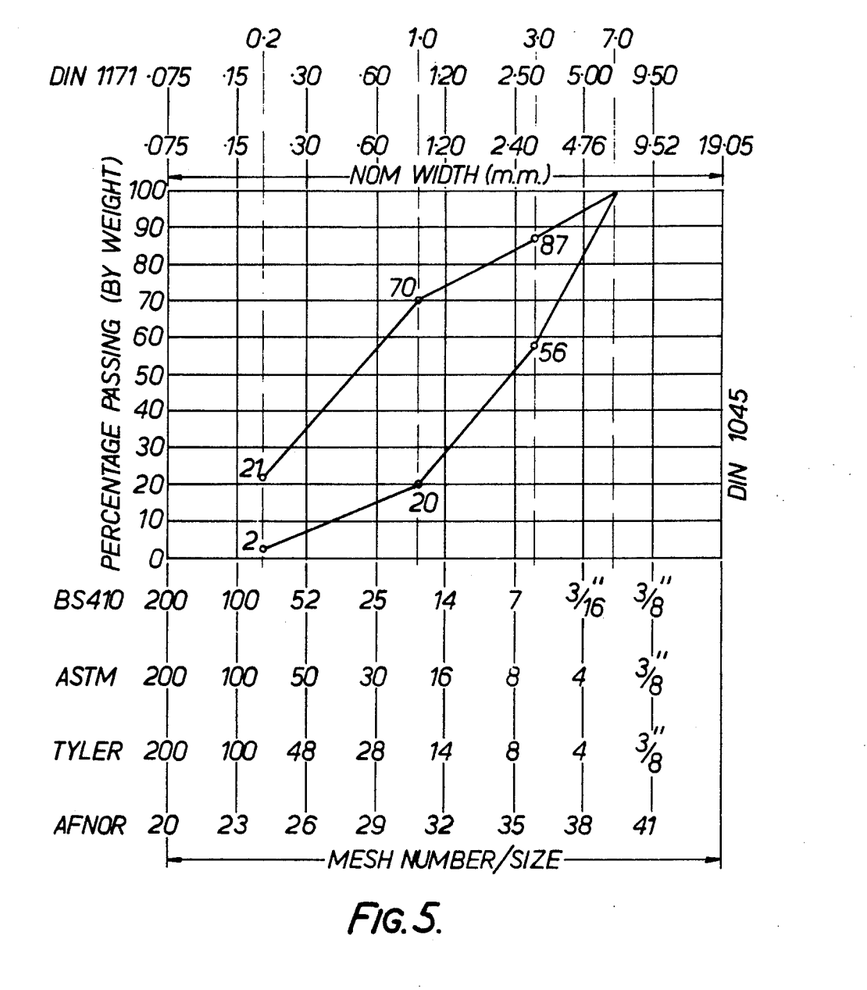
Figure 6:
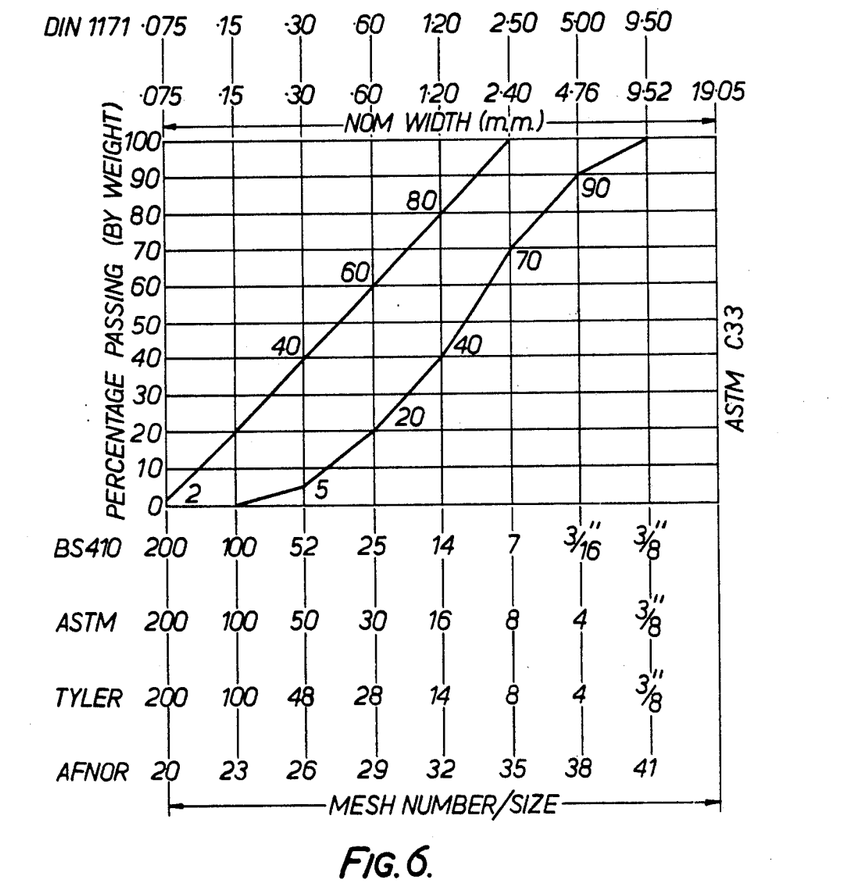

FIGS. 1 to 6 illustrate the recommendations for the grading of aggregate particle sizes in accordance with British Standard BS882 zone 1 (FIG. 1); British Standard BS882 zone 2 (FIG. 2); British Standard BS882 zone 3 (FIG. 3); British Standard BS882 zone 4 (FIG. 4); German Standard DIN1045 (FIG. 5) and American Standard ASTMC33 (FIG. 6). These Figures are graphs plotting sieve mesh numbers/sizes against the percentage, by weight, of aggregate particles passing therethrough. In each Figure, upper and lower spectrum lines are shown and for an aggregate to meet one of these Standards, its spectrum line should fall somewhere between the two upper and lower spectrum lines shown.

In accordance with preferred features of the present invention a cementitious composition includes an aggregate which consists of conductive particles, in the specific examples now to be considered calcined oil coke, which are graded as if they were a normal aggregate to be introduced into a basic concrete mix. By applying the principles of grading set out in the National Standards illustrated in FIGS. 1 to 6 to calcined oil coke as opposed to conventional aggregate, not only have concretes resulted which are of satisfactory structural strength, but also of extremely low resistance — normally at least as low as 2Ω centimeter.

Whilst the best results have been found to be obtained by grading the calcined oil coke in accordance with one or more of the above mentioned Standards, since maximum strength and minimum electrical resistance may thereby be obtained, the calcined oil coke may be graded over a spectrum of particle sizes lying outside of the recommendations discussed above, where, for example, the structural material is to be used as a screed or rendering in which mechanical strength is not of paramount importance. Grading the calcined oil coke particle sizes over a spectrum of particle sizes giving a distribution of particle sizes not in accordance with one of the National Standards will still be found to give a useful reduction in resistivity compared, for example, with a concrete, which has conductive material added of similar nominal particle size.

Figure 7:
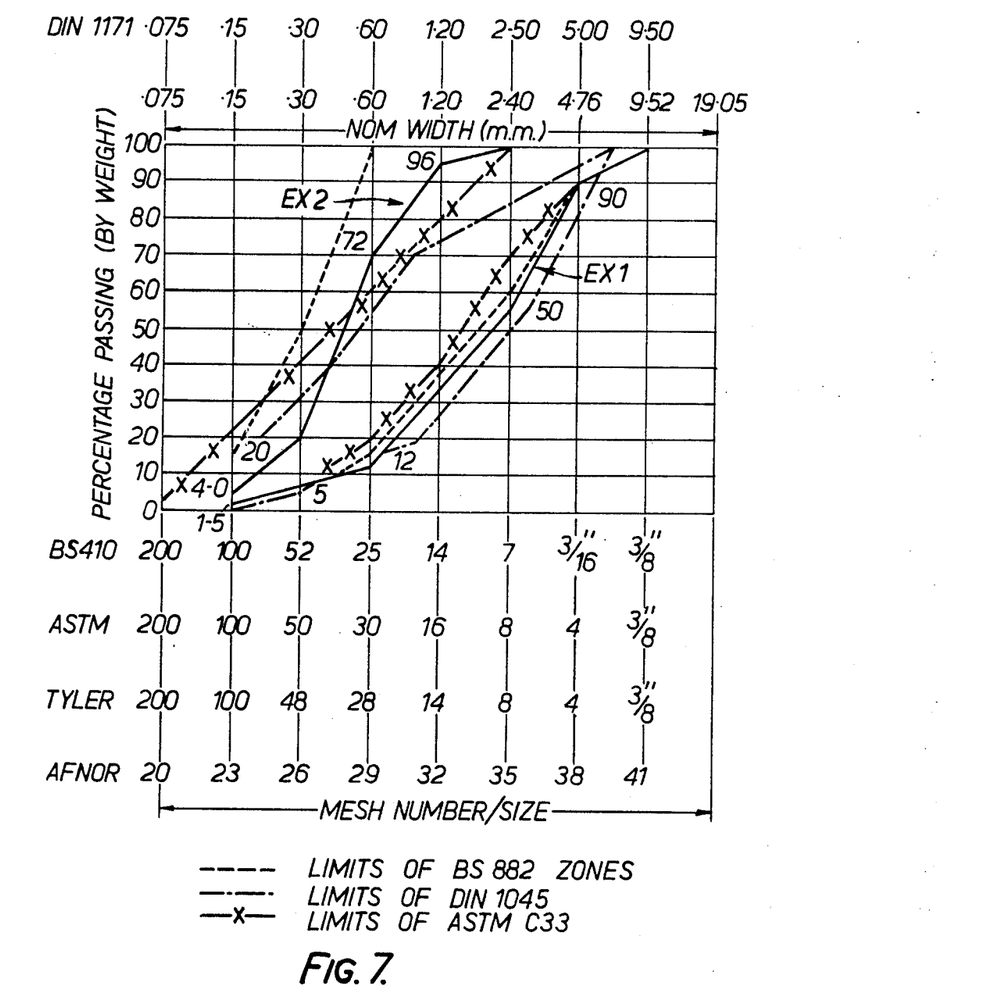
FIG. 7 illustrates on one graph the spectrum limits of B.S. 882, D.I.N. 1045 and A.S.T.M. C33.

FIG. 7 sets out the spectrum limits of BS882, DIN1045 and ASTMC33 together on one graph. For satisfactory mechanical strength and satisfactory low resistance, it may be considered satisfactory to grade the particle sizes of the calcined oil coke over a spectrum of sizes which falls somewhere within the extreme limits of the combined specifications represented in FIG. 7.

Specific examples of aggregate consisting of calcined oil coke particles having a size distribution between relatively large and relatively small particles will now be considered.

EXAMPLE 1

A quantity of oil coke is assembled with its particle sizes graded from 100 mesh to ⅜ inch. Particles of nominal sizes of 100 mesh (0.15mm), 52 mesh (0.3mm), 25 mesh (0.6mm), 14 mesh (1.2mm), 7 mesh (2.5mm), 3/16 inch and ⅜ inch were included in the following percentages by weight passing through British Standards BS410 sieves.

| BS410 Sieve Size | % by weight passing BS410 sieves |
|---|---|
| 3/8" | 100 |
| 3/16" | 90 |
| 7 | 56 |
| 14 | 25 |
| 25 | 12 |
| 52 | 5 |
| 100 | 1.5 |

The aggragate thus formed, as may be seen from the right hand full line in the graph of FIG. 7, exhibits a spectrum of particle sizes, which lies at the limit of the combined recommended standards illustrated by FIG. 7. If to ordinary Portland cement a quantity of this graded calcined oil coke aggregate equal, for example, to 25% by dry weight of the cement, is added, together with a quantity of water equal to 20% by dry weight of the solids, a concrete results which would be of good mechanical strength and low electrical resistance, but which would not satisfy all of the National Standards.

EXAMPLE 2

A quantity of oil coke is assembled with particle sizes graded as in Example 1, but with the particle sizes present in the following percentages by weight passing through British Standards BS410 sieves.

| BS410 Sieve Size | % by weight passing BS410 sieves |
|---|---|
| 3/8" | 100 |
| 3/16" | 100 |
| 7 | 100 |
| 14 | 96 |
| 25 | 72 |
| 52 | 20 |
| 100 | 4 |

The aggregate thus formed, as may be seen from the left hand full line in the graph of FIG. 7, exhibits a spectrum of particle sizes which lies within the limits of the recommended British Standards, but not wholly within the limits of the combined Standards illustrated by FIG. 7. Again the concrete which would result, if this aggregate was mixed with cement and water added as with Example 1, would be of good mechanical strength and low electrical resistance, but would not satisfy all of the National Standards.

Examples 1 and 2 given above may be mixed together in different percentages to provide spectrums of particle sizes lying between the two spectrums exhibited by the Examples themselves. This is illustrated in the table given in FIG. 8 which shows different mixtures of Examples 1 and 2 producing Examples 3 to 11.

Examples 3 to 11 could, of course be compiled directly. Often, however, it is simpler to analyse samples of given coke aggregate and combine the different aggregates in the manner illustrated by FIG. 8.

Figure 8:
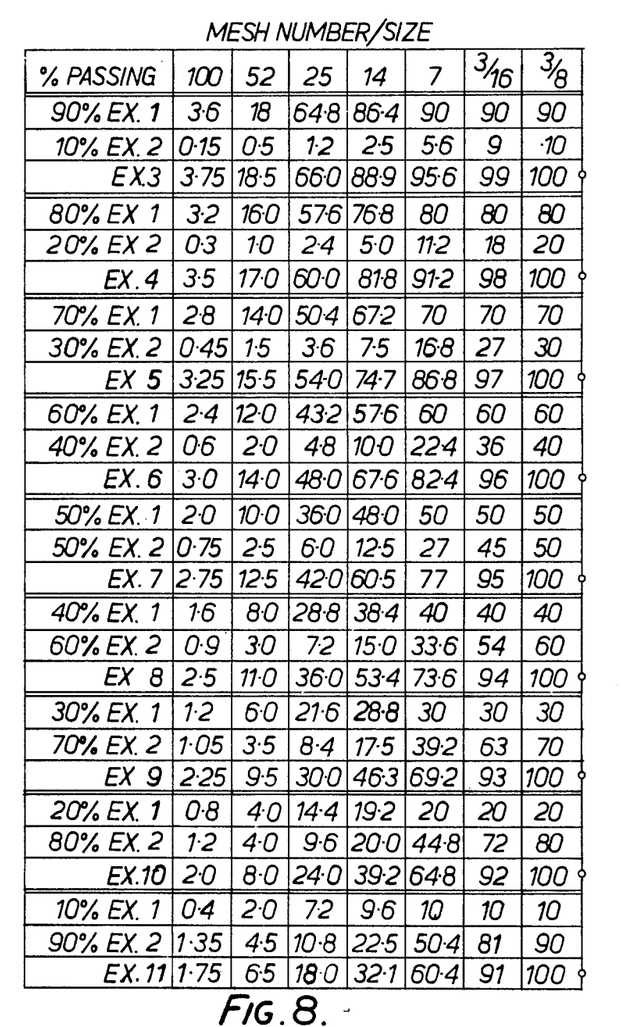
FIG. 8 is a table of examples of graded calcined oil coke aggregate which may be used in carrying the present invention into effect.

As may be determined the Examples 3 to 11 in FIG. 8 satisfy British, German and American standards as follows:

| EXAMPLE | BS882 | DIN1045 | ASTM C33 |
|---|---|---|---|
| 3 | Zone 3 | No | No |
| 4 | Zone 3 | No | No |
| 5 | Zone 2 | No | Yes |
| 6 | Zone 2 | Yes | Yes |
| 7 | Zone 2 | Yes | Yes |
| 8 | — | Yes | Yes |
| 9 | Zone 1 | Yes | Yes |
| 10 | Zone 1 | Yes | No |
| 11 | Zone 1 | Yes | No |

To illustrate the structural strengths of concretes provided in accordance with the present invention, a standard series of tests were applied for different mixtures of a concrete formed of ordinary Portland cement (O.P.C.) and a calcined oil coke aggregate in accordance with Example 7 given above, that is to say, a coke aggregate satisfying BS882 zone 2, with water.

Figure 9A:
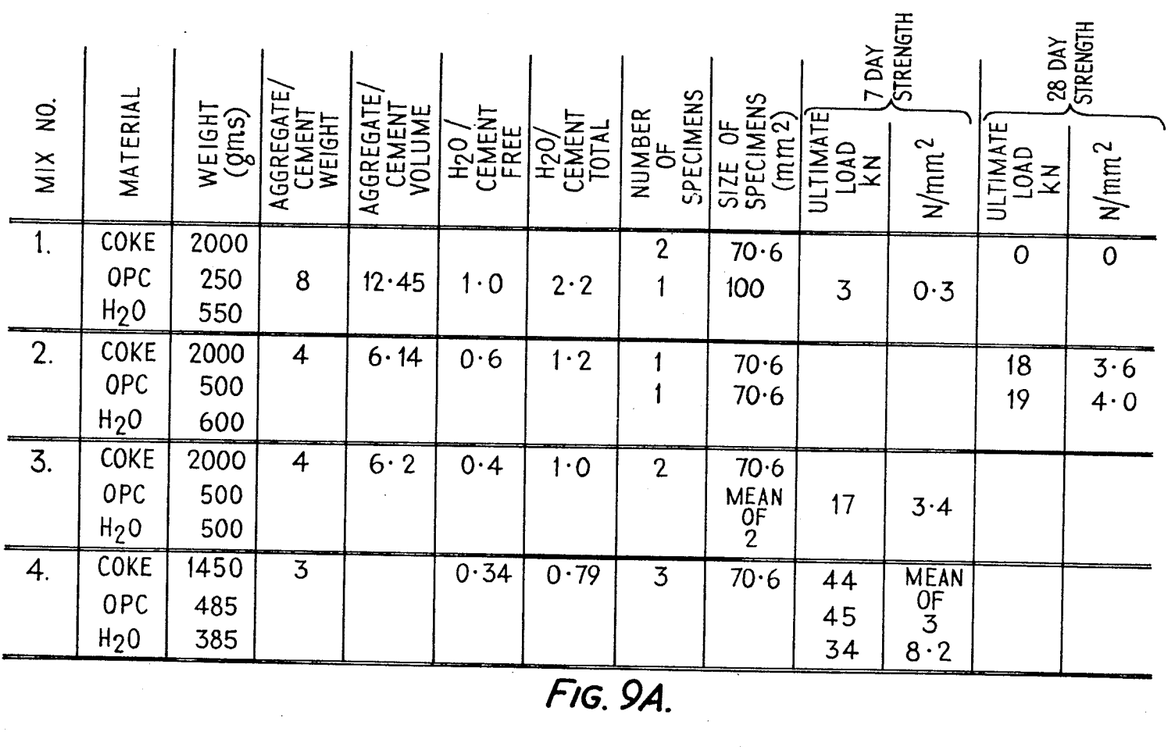
FIG. 9 is a reproduction of a report on standard strength tests carried out on a concrete in accordance with the present invention in which a calcined oil coke aggregate was included as per example 7 of FIG. 8.
Figure 9B:
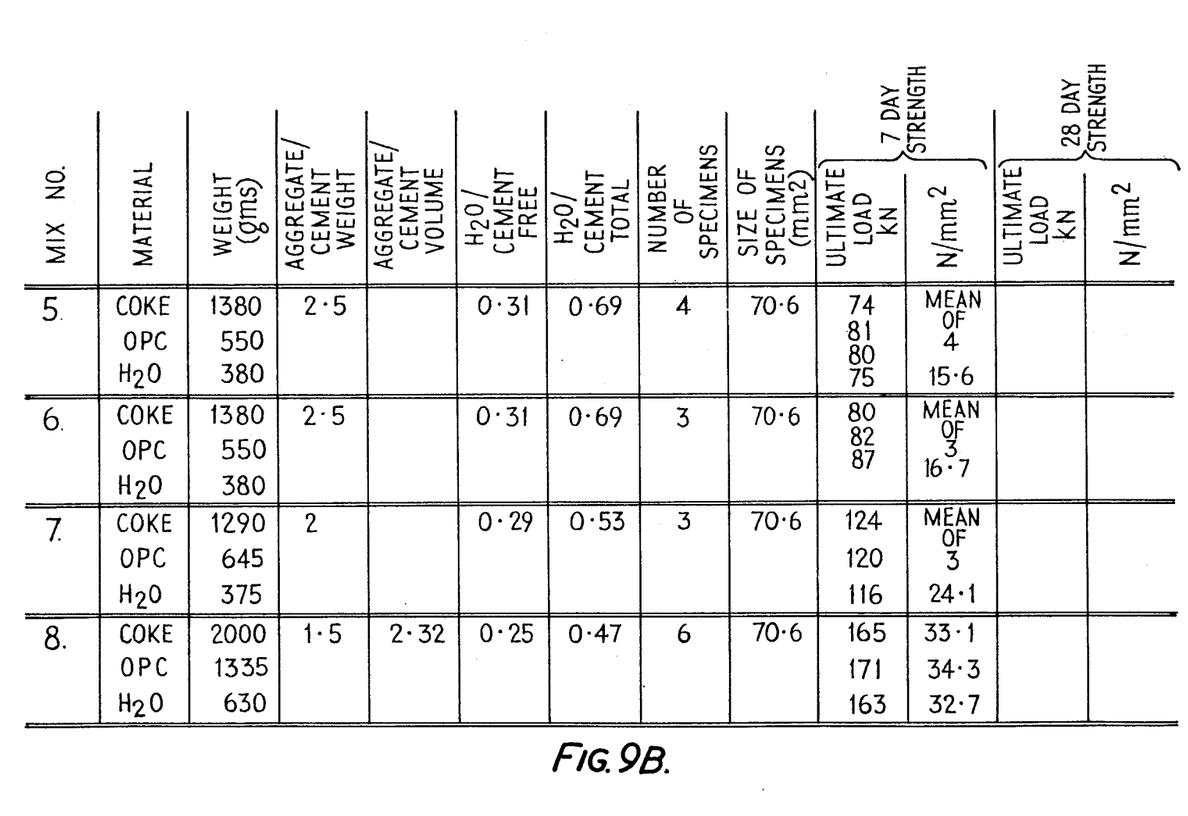
Figure 9C:
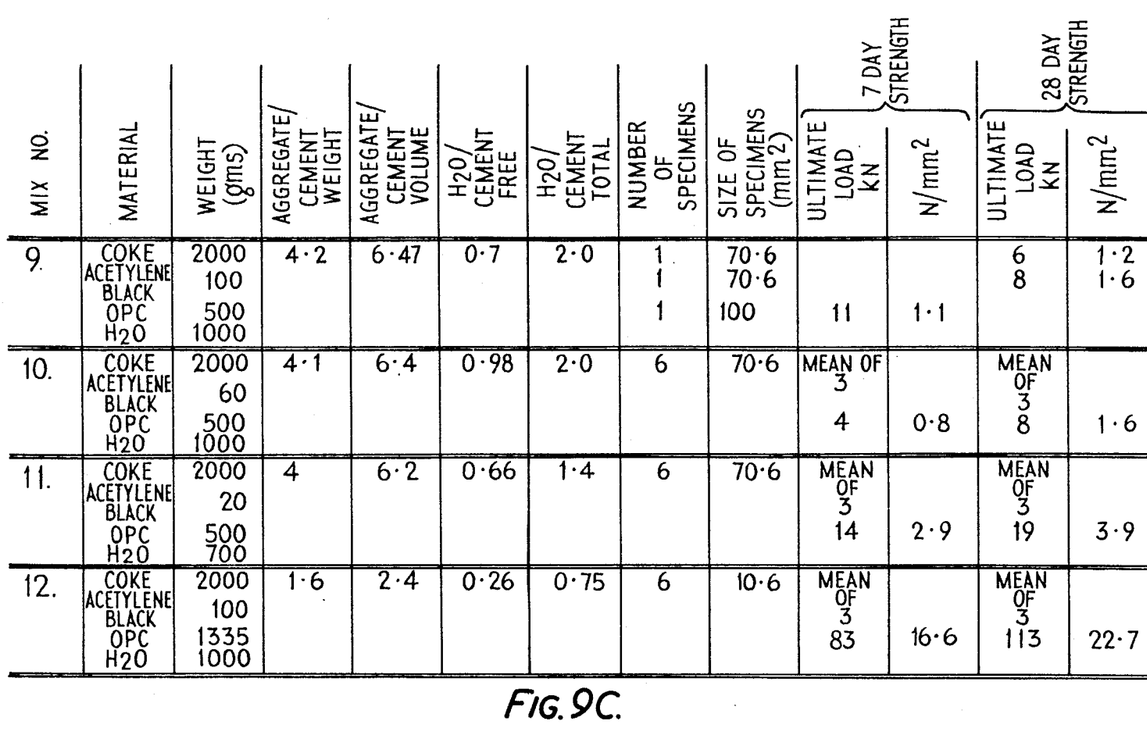

The composition of these different concretes and results of these standard tests were as set forth in the table given in FIG. 9. As will be seen concretes 9 to 12 in FIG. 9 include small quantities of acetylene black. In each case, as will be seen, the aggregate consisted solely of conductive particles of acetylene black and/or calcined oil coke. No conventional aggregate materials formed part of the aggregate.

In the table of FIG. 9 $N/mm^2 = 10.2 \ kg/cm^2 = 145.5 \ lbf/in^2$.

In all cases very low values of resistivity were obtained. For example, in the case of concretes 2, 4, 5, 6, 7, 8 and 12 set out in FIG. 9, resistivities at least as low as 2Ω centimeter were observed.

In all cases, the value of resistivity obtained was observed to be very stable. In the case of a concrete in accordance with example 7, for example the concrete showed an initial resistivity of 0.52 ohm-centimeter, measured at 300 Hz, which increased to 0.62 ohm-centimeter after 150 hours from setting and during the subsequent 2000 hours varied between a maximum of 0.66 ohm-centimeter and a minimum of 0.61 ohm-centimeter.

Figure 10:
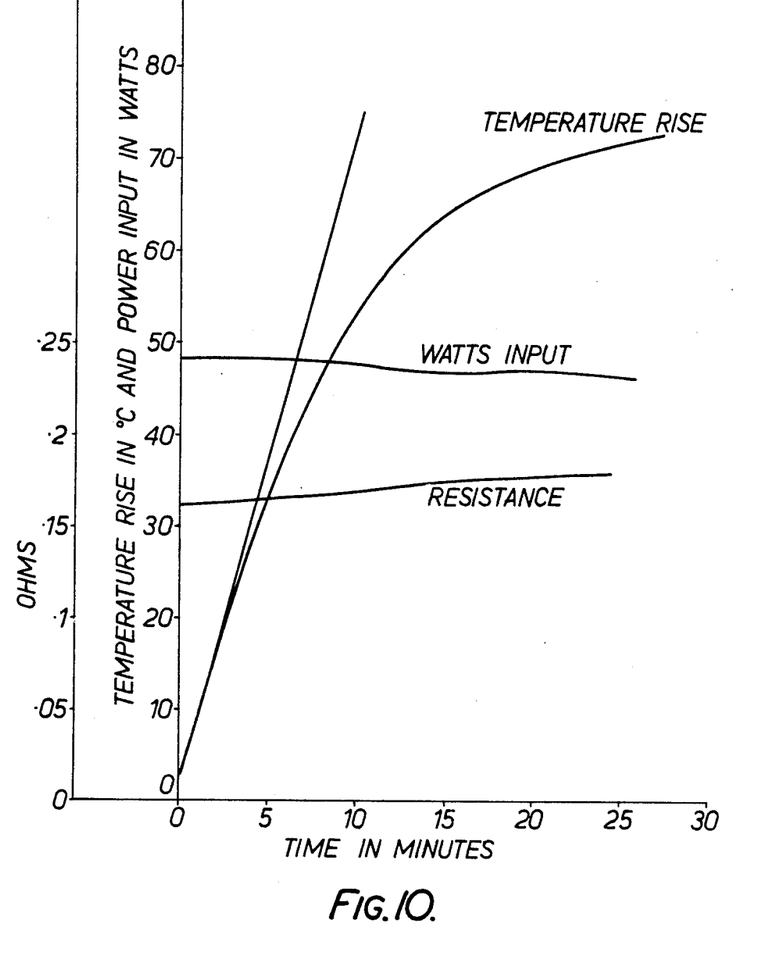
FIG. 10 is a graph relating to the electrical characteristics of another concrete in accordance with the present invention.

Another example of a similar concrete was subjected to thermal tests. It was found to have a specific heat of 2.77, for a maximum rate of temperature rise of 70°C per second, a current density of 24.8 amps/sq. cm. (160 amps/sq. in. and a temperature coefficient of resistance in the order of 0.16% per °C, as represented by the graph of FIG. 10.

Where graded particle size coke is not available directly from a crude oil distillation company, larger particles of coke may, of course, be crushed in a manner known per se — specialist firms exist providing suitable crushing facilities — to provide coke of the desired particle sizes.

Figure 11:
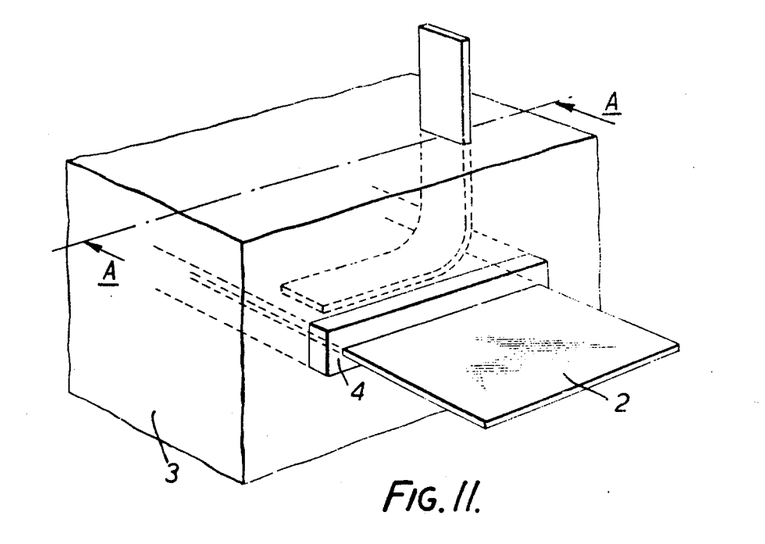
Figure 12:
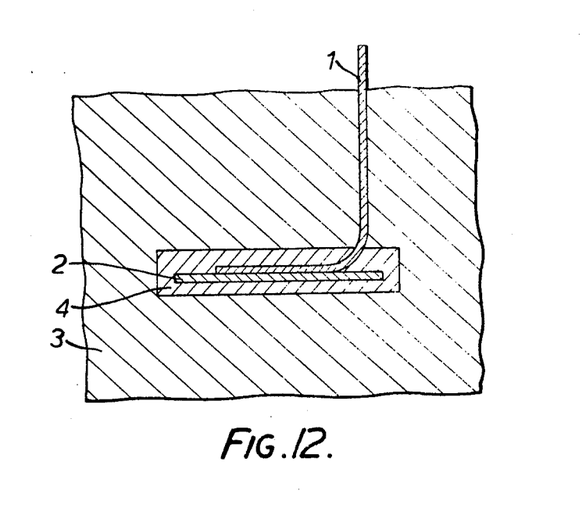

Reference will now be made to the accompanying FIGS. 11 and 12 in which FIG. 11 is a part cut-away view of one electrically conductive structure, in this case an earth connection, provided in accordance with the present invention, and FIG. 12 is a section along the line A—A of FIG. 11.

Referring to FIGS. 11 and 12, it is required to connect a conductor 1 to earth. To achieve this the conductor 1 is connected by rivetting or welding to a copper plate electrode 2 which is embedded in a mass of concrete 3 which itself occupies a cavity (not represented) formed in the earth's surface. The concrete mass 3 is formed in accordance with example 7 in the table of FIG. 9.

In order to reduce the possibility which exists in certain circumstances of moisture penetrating the concrete mass to cause electrolytic action between the conductive material of the plate electrode 2 and the conductive particles in the concrete mass 3, the plate electrode 2 and part of the conductor 1 where it is attached to the electrode 2 are encapsulated by a relatively small mass of concrete 4. The mass of concrete 4 is again in accordance with example 7 of FIG. 9, but with the addition to the mix of a waterproofing agent in quantities as recommended by the manufacturer. A number of waterproofing agents for use in concrete are available. For example a range is available under the Trade Name PROPALIN of which that known as type 031 is preferred.

It would be possible to include a water-proofing agent in the greater mass 3 of concrete, and omit the encapsulating layer 4. The use of an encapsulating layer such as 4 into which the plate electrode 2 is set as a preliminary step, is often more convenient however.

The concrete forming mass 3 includes as an expanding agent aluminium powder added at a rate of 8g/Kg of dry cement powder, which tends to resist any tendency for the concrete to shrink away from the walls of the cavity in the earth's surface as it sets.

We claim:

1. A setable composition for use as a structural material comprising a cementitious material and an aggregate, wherein said aggregate contains quantities of carbonaceous material ranging in size between relatively large carbonaceous particulate material and relatively small carbonaceous particulate material, said aggregate constituting at least 20% by weight of the solid contents of the composition, and wherein the aggregate consists of particles of a size distribution such that the spectrum of sizes falls within the extreme limits of the combined specifications of British Standards 882, German Standards DIN 1045 and American Standards ASTMC 33, relating to the spectrum of particle sizes recommended for conventional aggregates in cementitious compositions.

2. A setable composition as claimed in claim 1 and wherein said aggregate consists of carbonaceous particles of a size distribution such that the spectrum of sizes falls wholly within one National Standard relating to the spectrum of particle sizes recommended for conventional aggregates.

3. A setable composition as claimed in claim 1 and wherein said aggregate is composed substantially entirely of carbonaceous material.

4. A setable composition as claimed in claim 3 and wherein said electrically conductive material is calcined oil coke.

5. A setable composition as claimed in claim 1 and including an expanding agent.

6. A composition as claimed in claim 5 and wherein said expanding agent is aluminium powder added at the rate of 8g/Kg of dry cement powder.

7. A setable composition for use as a structural material comprising a cementitious material and an aggregate, wherein said aggregate comprises particulate carbonaceous material consisting of at least two fractions, one fraction being relatively large carbonaceous particles and the other fraction being relatively small carbonaceous particles and wherein said relatively large particles consists of particles of a size such that they are all retained on a number 14 British Standards sieve and said relatively small electrically conductive material consists of particles of a size such that they all pass a number 100 British Standards sieve, said aggregate constituting at least 20% by weight of the solid contents of the composition.

8. A setable composition as claimed in claim 7 and wherein the ratio of the quantity by weight of said relatively large particles and the quantity of said relatively small particles is in the range 1:1 to 50:1.

9. A setable composition for use as a structural material comprising a cementitious material and an aggregate, wherein said aggregate comprises particulate carbonaceous material consisting of at least two fractions, one fraction being relatively large carbonaceous particles and the other fraction being relatively small carbonaceous particles and wherein said relatively large particles are all of a size such as to be retained on a ⅜ inch mesh sieve and said relatively small particles are all of a size such as to pass a number 300 mesh British Standards sieve, said aggregate constituting a least 20% by weight of the solid contents of the composition.

10. A setable composition as claimed in claim 9 and said relatively large particles having a nominal size of one half inch and said relatively small particles having a nominal diameter ranging from 20 to 50 Angstrom Units.

11. A setable composition as claimed in claim 9 and wherein said relatively large fraction is calcined oil coke and said relatively small fraction is acetylene black.

12. A setable composition as claimed in claim 9 and wherein said cementitious material comprises at least 50% by weight of one or more materials which are capable of forming on reaction with water, stable, substantially insoluble, hydrated calcium silicates and/or calcium aluminates.

13. A setable composition as claimed in claim 9 and wherein said cementitious material includes a Portland cement.

14. A setable composition for use as a structural material comprising a cementitious material and an aggregate and wherein the aggregate consists of carbonaceous particles of a size distribution such that the slope of a plot of the log to the base ten of the percentages of carbonaceous particles passing the various sieves against the log to the base ten of the mesh sizes in microns of said sieves is in the range 0.35 to 0.65, said aggregate constituting at least 20% by weight of the solid content of the composition.

15. A composition capable of setting to produce a structural material having an electrical resistivity of not more than about 25 ohm-centimeter, said composition consisting essentially of:
 a. a cementitious component; and
 b. an aggregate which comprises particulate electroconductive material consisting of at least two fractions of disparate particle size, one fraction being calcined oil coke having a nominal particle size of ½ inch and another fraction being material selected from the group consisting of calcined oil coke and acetylene black and being of a particle size not larger than 1/10 the particle size of said one fraction, said aggregate constituting at least 20% by weight of the solid contents of the composition.

16. A composition as defined in claim 15 wherein said aggregate consists of said two fractions plus a plurality of further fractions, said further fractions being of different particle sizes ranging between the sizes of said two fractions.

17. A composition as defined in claim 16 wherein all of said fractions are calcined oil coke.

18. A composition as defined in claim 16 wherein the smallest size fraction is acetylene black and the remaining fractions are calcined oil coke.

19. A composition as defined in claim 15 wherein said bonding material consists of Portland cement and sand in approximately equal parts by weight.

20. An aggregate for use in forming an electrically conductive setable composition, said aggregate essentially consisting of two portions of different particle size, one portion consisting of particles of a carbonaceous material having a relatively large mean size such that they are all retained on a number 14 British Standards sieve, the other portion consisting of particles of an electrically conductive material having a relatively small mean size such that they all pass a number 100 British Standards sieve, the ratio of the quantity by weight of said one portion and the quantity by weight of said other portion being in the range 1:1 to 50:1.

21. An aggregate as recited in claim 20 wherein said one portion is calcined oil coke and said other portion is acetylene black.

22. An aggregate for use in forming an electrically conductive setable composition, said aggregate being gap-graded and essentially consisting of two portions of different particle size, one portion consisting of particles of carbonaceous material having a relatively large mean size such that they are all retained on a ⅜ inch mesh sieve, the other portion consisting of particles of carbonaceous material having a relatively small mean size such that they all pass a number 300 mesh British Standards sieve, whereby said relatively large particles of electrically conductive material have a nominal size of ½ inch and said relatively small particles of electrically conductive material have a nominal diameter of at least 20 but not greater than 50 angstrom units.

23. An aggregate for use in forming an electrically conductive setable composition having an electrical resistivity of not more than about 25 ohm-centimeters, said aggregate essentially consisting of more than two portions of carbonaceous material, each portion having a given size, each given size corresponding to the mesh size of a distinct sieve which would retain particles larger than said given size and pass particles smaller in size than said given size, each portion constituting a given percentage by weight of said aggregate so that the slope of a plot of the log to the base 10 of the percentage of particles which would pass each of said distinct sieves against the log to the base 10 of the mesh sizes in microns of said distinct sieves is at least 0.35 but not greater than 0.65.

24. An aggregate for use in forming an electrically conductive setable composition having an electrical resistivity of not more than about 25 ohm-centimeters, said aggregate consisting essentially of a plurality of portions of carbonaceous material, wherein said portions are made up of the following proportions by weight of particle sizes: approximately 0 to 20% of a size such as to be retained by a BS410 sieve size 3/16 of an inch, approximately 0 to 30% of a size such as to be retained by a BS410 sieve size 7, approximately 0 to 25% of a size such as to be retained by a BS410 sieve size 14, approximately 0 to 10% of a size such as to be retained by a SB410 sieve size 25, approximately 50 to 8% of a size such as to be retained by a BS410 sieve size 52, approximately 30 to 7% of a size such as to be retained by a BS410 sieve size 100, and approximately 20 to % of a size such as to pass through a BS 410 sieve size 100.

25. An aggregate as recited in claim 24 wherein said aggregate consists entirely of calcined oil coke.

26. An aggregate for use in forming an electrically conductive setable composition having an electrical resistivity of not more than about 25 ohm-centimeters, said aggregate consisting essentially of a plurality of portions of carbonaceous material, wherein said portions are made up of the following proportions by weight of particle sizes: approximately 0 to 10% of a size such as to be retained by a BS882 sieve size 3/16 of an inch, approximately 0 to 30% of a size such as to be retained by a BS882 sieve size 7, approximately 0 to 20% of a size such as to be retained by a BS882 sieve size 14, approximately 0 to 25% of a size such as to be retained by a BS882 sieve size 25, approximately 50 to 10% of a size such as to be retained by a BS882 sieve size 52, approximately 35 to 5% of a size such as to be retained by a BS882 sieve size 100, and approximately 15 to 0% of a size such as to pass through a BS882 size 100.

27. An aggregate for use in forming an electrically conductive setable composition having an elecrical resistivity of not more than about 25 ohm-centimeters, said aggregate consisting essentially of a plurality of portions of carbonaceous material, wherein said portions are made up of the following proportions by weight of particle sizes: approximately 5 to 20% of a size such as to be retained by a DIN1045 sieve size 3/16 of an inch, approximately 10 to 30% of a size such as to be retained by a DIN1045 sieve size 7, approximately 10 to 25% of a size such as to be retained by a DIN1045 sieve size 14, approximately 20 to 10% of a size such as to be retained by a DIN1045 sieve size 25, approximately 25 to 8% of a size such as to be retained by a DIN1045 sieve size 52, approximately 20 to 7% of a size as to be retained by a DIN1045 sieve size 100, and approximately 10 to 0% of a size such as to pass through a DIN1045 sieve size 100.

28. An aggregate for use in forming an electrically conductive setable composition having an electrical resistivity of not more than about 25 ohm-centimeters, said aggregate consisting essentially of a plurality of portions of carbonaceous material, wherein said portions are made up of the following proportions by weight of particle sizes: approximately 0 to 10% of a size such as to be retained by a ASTM C33 sieve size 3/16 of an inch, approximately 0 to 20% of a size such as to be retained by a ASTM C33 sieve size 7, approximately 20 to 30% of a size such as to be retained by a ASTM C33 sieve size 14, approximately 20% of a size such as to be retained by a ASTM C33 sieve size 25, approximately 20 to 15% of a size such as to be retained by a ASTM C33 sieve size 52, approximately 20 to 5% of a size such as to be retained by a ASTM C33 sieve size 100, and approximately 20 to 0% of a size such as to pass through a ASTM C33 sieve size 100.

29. An earth connection comprising an electrode set into the earth by a composition as claimed in claim 28.

30. An anti-static concrete floor comprising a screed formed of a composition as claimed in claim 1.

31. A structure or building having a wall or walls formed at least in part of a composition as claimed in claim 1 in order to afford radio frequency screening.

32. A building or structure comprising at least one section of wall extending the full height of said building or structure and composed of a composition as claimed in claim 1 arranged to act as a lightning conductor.

* * * * *